United States Patent

Komori

[11] Patent Number: 6,078,988
[45] Date of Patent: Jun. 20, 2000

[54] HIGH SPEED DATA RECORDING AND REPRODUCING APPARATUS AND METHOD THAT MUTUALLY MONITORS THE USING RATIOS OF BUFFER MEMORIES TO THEREBY CONTROL THE READING OR WRITING OPERATION

[75] Inventor: Shinichi Komori, Kanagawa, Japan

[73] Assignee: Sony Corporation, Tokyo, Japan

[21] Appl. No.: 09/012,181

[22] Filed: Jan. 22, 1998

[30] Foreign Application Priority Data

Jan. 28, 1997 [JP] Japan ................................ 9-013793

[51] Int. Cl.[7] ................................................ G06F 13/14
[52] U.S. Cl. ................................ 711/112; 711/154
[58] Field of Search ............................ 711/112, 113, 711/110, 154

[56] References Cited

U.S. PATENT DOCUMENTS 5,414,455  5/1995  Hooper et al. ........................... 348/7
5,586,264  12/1996  Belknap et al. ........................ 709/219

Primary Examiner—David L. Robertson
Attorney, Agent, or Firm—Jay H. Maioli

[57] ABSTRACT

Data read out from a disk storage device by a read thread is stored into a ring buffer on a predetermined unit basis. This process is independently controlled every element. The data is read out from the buffer by an output thread in accordance with a predetermined order and is outputted as a stream. Each element includes the disk storage device, the read thread, and the ring buffer, and is periodically checked by the thread and a flag is set to an element in which a using ratio of the buffer is equal to or less than a predetermined value. When the flag has been set to the other elements and the using ratio of the buffer of the initially set element is equal to or larger than a predetermined value, each thread pauses the reading operation of the data from the disk. The absorption of a fluctuation in the disk and the distribution of the ability according to a load are executed by the buffer and the flag so that the moving image bit stream can be stably outputted.

4 Claims, 9 Drawing Sheets

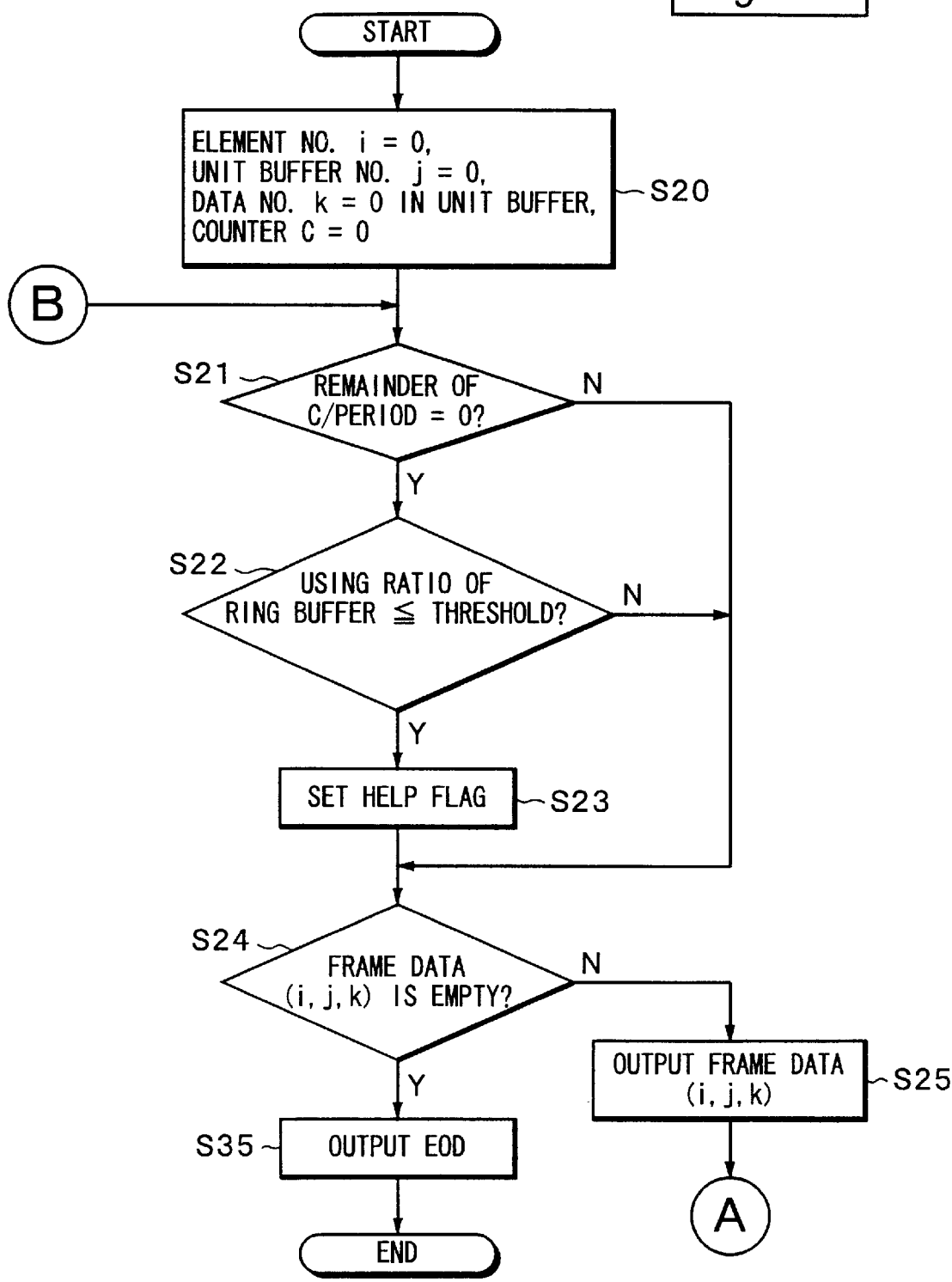

HIGH SPEED DATA RECORDING AND REPRODUCING APPARATUS AND METHOD THAT MUTUALLY MONITORS THE USING RATIOS OF BUFFER MEMORIES TO THEREBY CONTROL THE READING OR WRITING OPERATION

BACKGROUND OF THE INVENTION

1. Field of the Invention

The invention relates to a high speed data recording and reproducing apparatus for efficiently recording and reproducing a large amount of continuous data with a high data rate such as a moving image bit stream or the like to/from a plurality of disk devices arranged in parallel.

2. Description of the Related Art

Nowadays, use of an A/V server for recording what is called A/V (Audio/Video) data such as moving image data, audio data, and the like to a disk storage device such as a hard disk in place of a conventional tape medium is becoming wide spread. The A/V server ordinarily has a plurality of output channels and can independently output A/V data in parallel from the respective output channels. For example, in an A/V server which is used for transmission in a broadcasting station, A/V data of about 10 to 100 channels can be simultaneously outputted. In the A/V server, since a large amount of data is transferred at a high rate, for instance, a plurality of disk storage devices are connected in parallel and are used.

Hitherto, in order to control such a plurality of disk storage media, it is necessary to synchronize each disk storage device. As a method of synchronizing, either one of the following two methods has been used. The first method is a method whereby a reading or writing request is simultaneously sent to each disk storage device and the synchronization is obtained after the end of processes of all of the disk storage devices. The second method is a method whereby the rotation of a disk in each disk storage device is physically synchronized, thereby preventing a variation of performance in individual disk storage devices from occurring.

In the above methods, according to the first method, the time that is required by the A/V server in order to complete the reading/writing operation of data is equal to the time required by the disk storage device that finishes the individual processes last. On the other hand, an accessing time of each disk storage device depends on factors such as the rotation waiting time and the search time. Since those factors, however, differ for every device or process, they have a variation of a certain range. The first method, therefore, has a problem such that the accessing time of the whole server, which depends on the data rate, is longer than the average accessing time of each disk storage device of the server and, therefore, it is not efficient.

According to the second method, on the other hand, since physical factors such as an accessing time, etc. in each disk storage device constructing the server are identical, it is possible to expect that the accessing time of the whole server is almost equal to the average accessing time of each disk storage device. However, because special hardware is necessary as a disk storage device for this method there are problems such that the price is high and the usable storage capacity of the disk storage device is limited.

In the disk storage device, on the other hand, as a state where the accessing operation is most efficiently executed, a method whereby data is physically continuously arranged onto the disk storage device and the data is continuously accessed by a block size that is large to a certain extent without any disturbance is considered.

In order to continuously arrange a large amount of data, to implement this method however, the general OS (Operating System) cannot cope with such an arrangement and there is a problem that it is necessary to use a special OS. As mentioned above, in the A/V server, since it is necessary to output the data in parallel to a plurality of channels, there is also a problem that it is impossible to continuously access the data without any disturbance.

OBJECTS AND SUMMARY OF THE INVENTION

It is, therefore, an object of the invention to provide a high speed data recording and reproducing apparatus and method which can use general disk storage devices and can obtain a data rate that is almost equal to an average accessing time of each disk storage device as a whole.

To solve the above problems, according to the invention, there is provided a high speed data recording apparatus which uses a plurality of disk storage devices in parallel and continuously reproduces a large amount of data of a high data rate, comprising: a plurality of disk storage means in which a bit stream is divided and stored; one or a plurality of control means, provided for each of the plurality of disk storage means, for respectively independently controlling accesses to the disk storage means; memory means which is provided for each of the disk storage means and has a circulative structure such that data which is written into the disk storage means is temporarily stored by a predetermined unit in accordance with the control of the control means; and input means for sequentially storing supplied bit streams as to be the data written into the respective memory means in accordance with a predetermined order.

To solve the above problems, according to the invention, there is also provided a high speed data reproducing apparatus which uses a plurality of disk storage devices in parallel and continuously reproduces a large amount of data of a high data rate, comprising: a plurality of disk storage means in which a bit stream is divided and stored; one or a plurality of control means, provided for each of the plurality of disk storage means, for respectively independently controlling accesses to the disk storage means; memory means which is provided for each of the disk storage means and has a circulative structure such that data which is read out from the disk storage means is temporarily stored on a predetermined unit basis on the basis of the control of the control means; and output means for sequentially reading out the data from the respective memory means in accordance with a predetermined order.

To solve the above problems, according to the invention, there is also provided a high speed data recording method whereby a plurality of disk storage devices are used in parallel and a large amount of data of a high data rate is continuously reproduced, comprising: a plurality of disk storage means in which a bit stream is divided and stored; one or a plurality of control steps which are provided for each of the plurality of disk storage means and respectively independently control accesses to the disk storage means; memory means which is provided for each of the disk storage means and has a circulative structure such that data which is written into the disk storage means is temporarily stored on a predetermined unit basis on the basis of the control in the control step; and a step of sequentially storing supplied bit streams as the write data into the respective memory means in accordance with a predetermined order.

To solve the above problems, according to the invention, there is also provided a high speed data reproducing method whereby a plurality of disk storage devices are used in parallel and a large amount of data of a high data rate is continuously reproduced, comprising: a plurality of disk storage means in which a bit stream is divided and stored; one or a plurality of control steps which are provided for each of the plurality of disk storage means and respectively independently control accesses to the disk storage means; memory means which is provided for each of the disk storage means and has a circulative structure such that data read out from the disk storage means is temporarily stored on a predetermined unit basis on the basis of the control in the control step; and a step of sequentially reading out the data from the respective memory means in accordance with a predetermined order.

As mentioned above, according to the invention, the supplied bit streams are stored in accordance with the predetermined order into one or a plurality of memory means which are provided for each of the plurality of disk storage means and have a circulative structure. The data stored in the memory means is written into the disk storage device. Therefore, a fluctuation in each of the disk storage devices when the bit streams are recorded can be absorbed.

According to the invention, the data read out from the plurality of disk storage means in which the bit stream was divided and stored is stored on a predetermined unit basis into one or a plurality of memory means which are provided for each of the disk storage means and have a circulative structure. The stored data is sequentially read out and outputted in accordance with the predetermined order. Therefore, a fluctuation in each of the disk storage devices when the bit streams are reproduced can be absorbed.

The above and other objects and features of the present invention will become apparent from the following detailed description and the appended claims with reference to the accompanying drawings.

BRIEF DESCRIPTION OF THE DRAWINGS

FIGS. 6A and 6B are flowcharts showing a disk control according to the invention;

DETAILED DESCRIPTION OF THE PREFERRED EMBODIMENT

Figure 1:
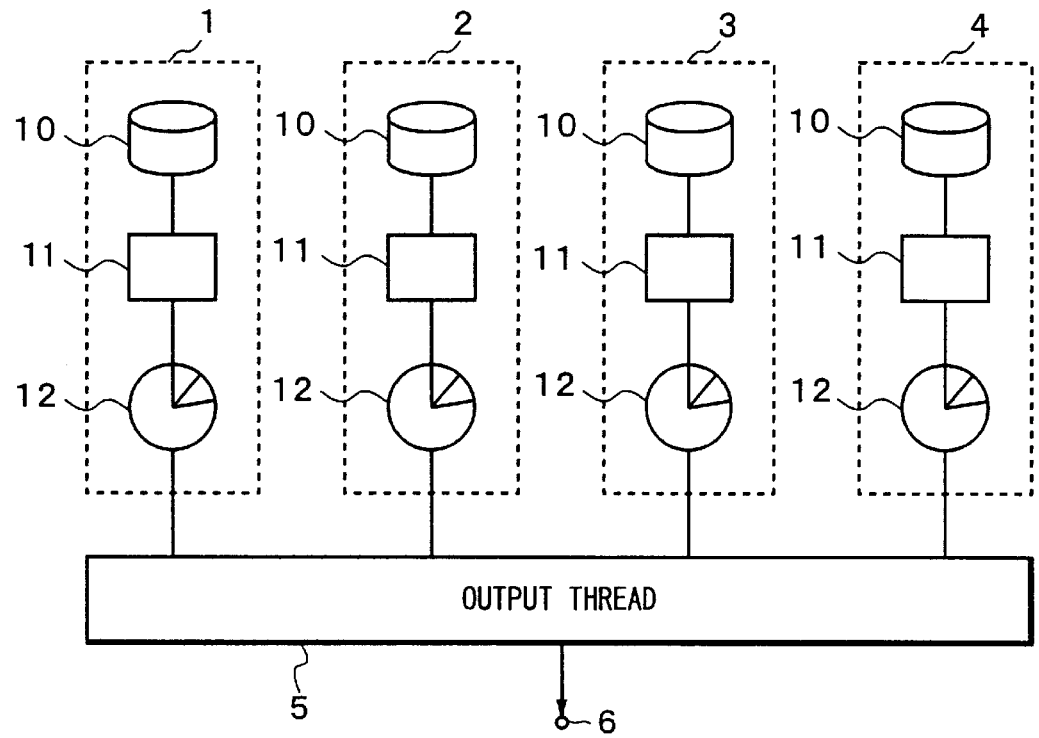
FIG. 1 is a block diagram showing an example of a construction of a data recording apparatus according to the invention.

An embodiment of the invention will now be described hereinbelow with reference to the drawings. FIG. 1 shows an example of a construction of a data recording apparatus according to the invention. In this example, elements 1, 2, 3, and 4 are connected to an output unit or output thread 5, respectively. The elements 1 to 4 and output thread 5 are controlled by a standard computer (not shown) having, for example, a CPU, RAM, ROM, and other necessary component elements. It is assumed that the computer is capable of multitasking, that is, it can simultaneously process a plurality of programs.

Each of the elements 1 to 4 has: a disk device 10 comprising, for example, a hard disk; a read unit or read thread 11 for controlling the reading operation of data from the disk device 10; and a ring buffer 12 for performing a buffering of the read-out data. The disk storage device 10 is not limited to a single hard disk but may be also a disk array constructed by a plurality of hard disks.

Among them, the disk storage device 10 is, for instance, a hard disk serving as a memory in each of the elements 1 to 4. The read thread 11 is a program which is formed by the above computer at the time of reading and is used for controlling the reading operation. By controlling an access to the disk storage device 10 by the read thread 11, the reading operation from the disk storage device 10 is controlled. The ring buffer 12 is a memory having a capacity of, for example, about tens of Mbytes to a few Gbytes for temporarily storing the data read out from the disk device 11 by the read thread.

One motion image bit stream is divided by a predetermined method and is stored into the disk storage device 10 which each of the elements 1 to 4 has. The motion image bit stream is made up of a bit stream in which frame data of an image continues. In this example, the motion image bit stream is compression encoded by a predetermined method and is recorded into the disk storage device 10. The invention is not limited to such a motion image bit stream, as a motion image bit stream which is not compression encoded can be also recorded to the disk storage device 10.

The motion image bit stream read out from the disk storage device 10 is outputted from each of the elements 1 to 4 and is supplied to the output thread 5. The output thread 5 is also a program which is formed by the computer (not shown) in a manner similar to the foregoing read thread 11. The moving image bit streams which were divided and supplied are combined by the output thread 5 and the combined bit stream is taken out at an output terminal 6. The moving image bit stream outputted to the output terminal 6 is supplied to, for instance, a monitor and is displayed. The invention is not limited to such a display but the moving image bit stream can be also transmitted to, for example, the network through a predetermined interface.

Figure 2:
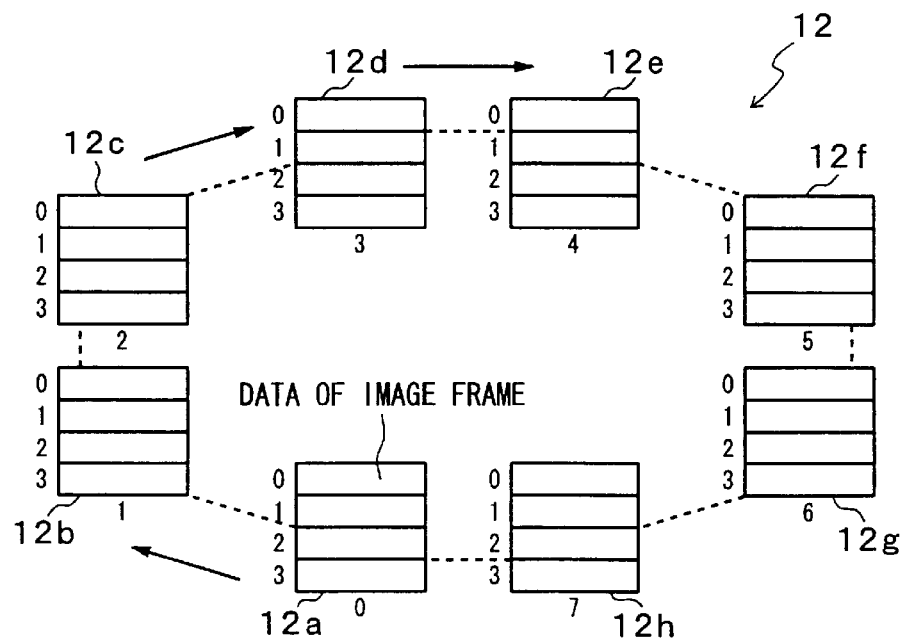
FIG. 2 is a diagram schematically showing an example of a structure of a ring buffer.

FIG. 2 schematically shows an example of a structure of the ring buffer 12. As shown in the diagram, the ring buffer 12 has a circulative structure such that buffers to store four image frames, namely, image frame data of four frames are labeled as a unit buffer and eight unit buffers are arranged like a ring.

When seeing the element 1 as an example, eight buffer areas each having a capacity of, for example, a few Mbytes are provided as unit buffers for the ring buffer 12 (unit buffers 12a, 12b, . . . , 12h). The image data of four frames is stored into each of the unit buffers 12a, 12b, . . . , 12h. The data is read out on a unit basis of four frames, respectively. For example, the data is sequentially read out like a ring in accordance with the order of the unit buffers 12a, 12b, . . . , 12h, 12a, 12b . . . . New data can be sequentially stored into the space from which the data has been read out, respectively.

A size of each of the unit buffers 12a to 12h can be changed in a software manner. That is, when the data is recorded into the disk storage device 10, the size of a unit buffer can be dynamically changed on the basis of information recorded as recording information. The unit buffer size, however, cannot be changed during the data reading operation. The size of each of the unit buffers 12a to 12h is set on the basis of a size of an image frame having the maximum data size among the image frames of the motion image bit stream which is read out from the disk storage device 10.

Figure 3:
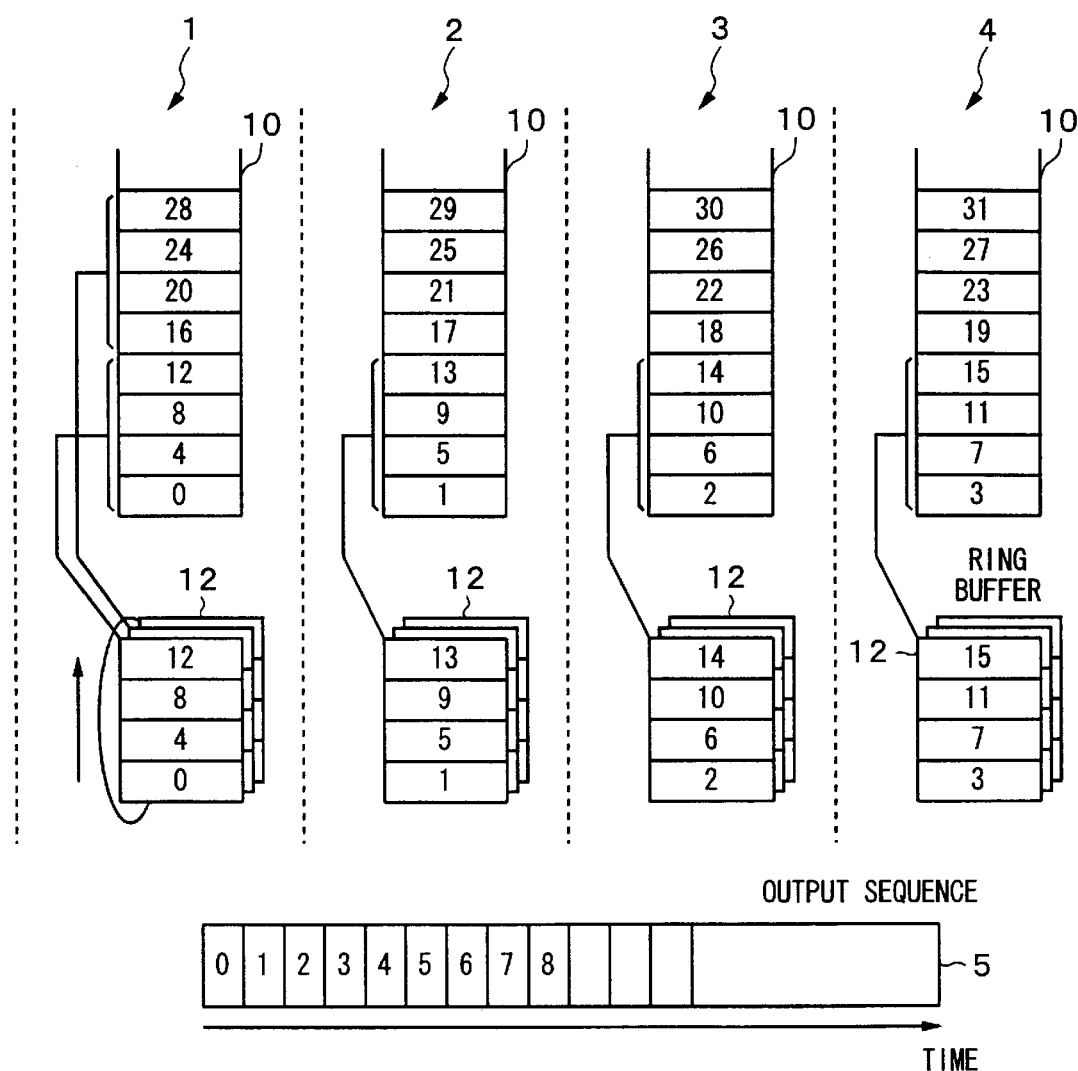
FIG. 3 is a diagram schematically showing an arrangement of image frames in each section of the apparatus.

FIG. 3 schematically shows an arrangement of the image frames in each section of the apparatus in the case where one moving image bit stream has been recorded for the data recording apparatus according to the invention. In FIG. 3, that is, the arrangement of the image frames on the disk device 10 and ring buffer 12 in each of the elements 1 to 4 is shown and the arrangement of image frames on the output thread 5 is also shown. In the diagram, numbers written sequentially to the image frames in accordance with the order from 0 indicate the time orders of the image frames.

The image frames are continuously stored into one disk storage device 10 every four frames in accordance with the time order. The different image frames are stored into each of the elements 1 to 4. The image frames as much as four frames are handled as a unit. For example, the zeroth frame, the fourth frame, the eighth frame, . . . are stored into the disk storage device 10 of the element 1. The 1st frame, the 5th frame, the 9th frame, . . . are stored into the disk storage device 10 of the element 2. The second frame, the sixth frame, the tenth frame, . . . are stored into the disk storage device 10 of the element 3. The 3rd frame, the 7th frame, the 11th frame, . . . are stored into the disk storage device of the element 4.

When a reading request is generated from the computer (not shown), the read thread 11 (omitted in FIG. 3) is formed in each of the elements 1 to 4, respectively. Four continuous image frames are read out from the disk storage device 10 by the read thread 11. The four read-out image frames are once stored into the ring buffer 12.

As mentioned above, the storage of the four image frames into the ring buffer 12 is executed to the space unit buffers among the unit buffers 12a, 12b, and 12h. In the example of the element 1, the frames are sequentially stored into the unit buffers 12a to 12h in the ring buffer 12 in a manner such that the 0th frame, the 4th frame, the 8th frame, and the 12th frame which were read out from the disk storage device 10 are stored into the unit buffer 12a, the 16th frame, the 20th frame, the 24th frame, and the 28th frame are stored into the unit buffer 12b, and the like, respectively.

In this instance, when there is no space unit buffer in the ring buffer 12, the reading operation of the image frames from the disk storage device 10 is stopped and no image frame is stored into the ring buffer 12.

The ring buffer 12 in each of the elements 1 to 4 in which the image frames were stored as mentioned above is respectively scanned by the output thread 5 and the image frames are set to a frame sequence of the correct time order and are outputted to the output terminal 6.

The using ratio of the ring buffer 12 in each of the elements 1 to 4 is examined at predetermined periods by the output thread 5 by, for example, checking the space unit buffers in the ring buffer 12 in each of the elements 1 to 4 at predetermined periods. When the using ratio is lower than a predetermined threshold value $T_1$, a flag is set into the ring buffer 12 by the output thread 5. This flag is called a help flag.

On the other hand, whether the help flag is set into the other elements is determined at predetermined periods by the read thread 11 of each of the elements 1 to 4, respectively. In any one of the other elements, if the help flag has been set into the ring buffer 12 and the using ratio of the ring buffer 12 of the self element is higher than a preset threshold value $T_2$, the apparatus is controlled by the read thread 11 so as to rest or pause the reading operation of the image frame from the disk storage device 10 for only a predetermined time.

When the using ratio of the ring buffer 12 is low, the fluctuation of a load or the fluctuation of the ability of the disk storage device 10 cannot be absorbed and there is a possibility that the moving image bit stream cannot stably be outputted. In the invention, therefore, as mentioned above, the using ratios of the ring buffer 12 in the respective elements 1 to 4 are mutually monitored and the reading operation from the disk storage device 10 is controlled on the basis of a monitor result. Thus, the load of the disk storage device 10 can be temporarily reduced and the using ratio of the ring buffer 12 in which the using ratio was reduced can be recovered. Consequently, the using ratios of the ring buffer 12 of the whole system can be almost equalized. The ability of the system can be distributed in accordance with the load.

The threshold value $T_1$ when the help flag is set and the threshold value $T_2$ when discriminating whether the access to the disk storage device 10 is rested or not are determined, for example, on the basis of specific experimental results.

Figure 4:
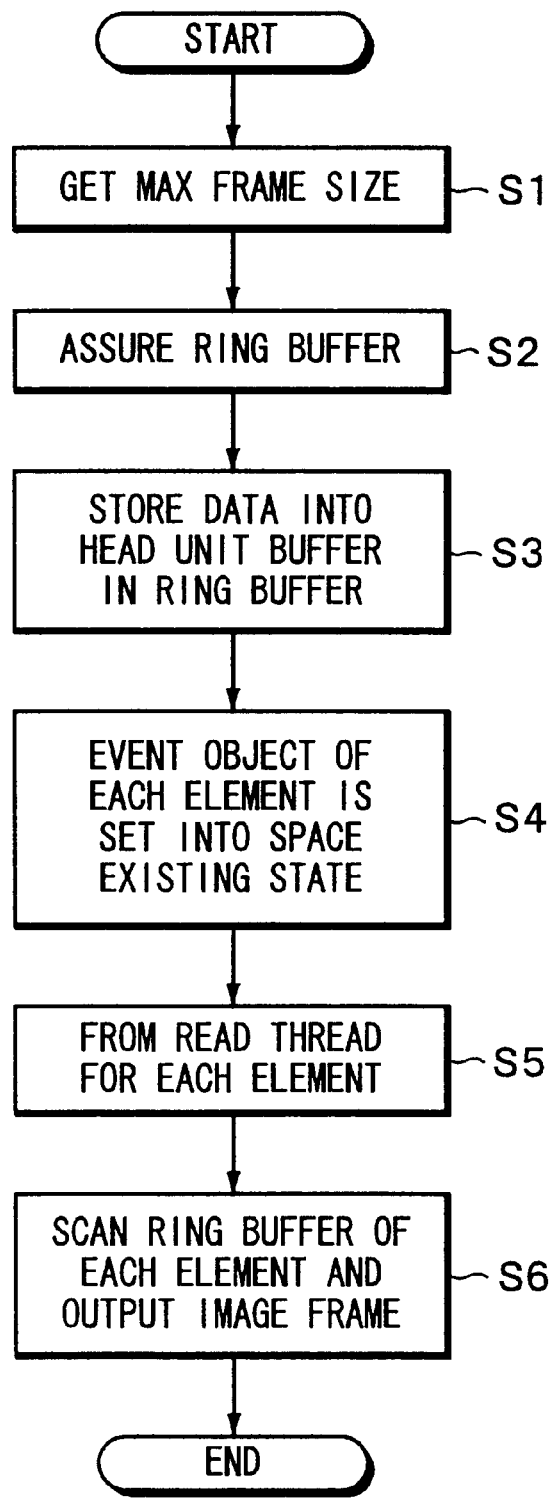
FIG. 4 is a flowchart showing a disk control according to the invention.
Figure 5:
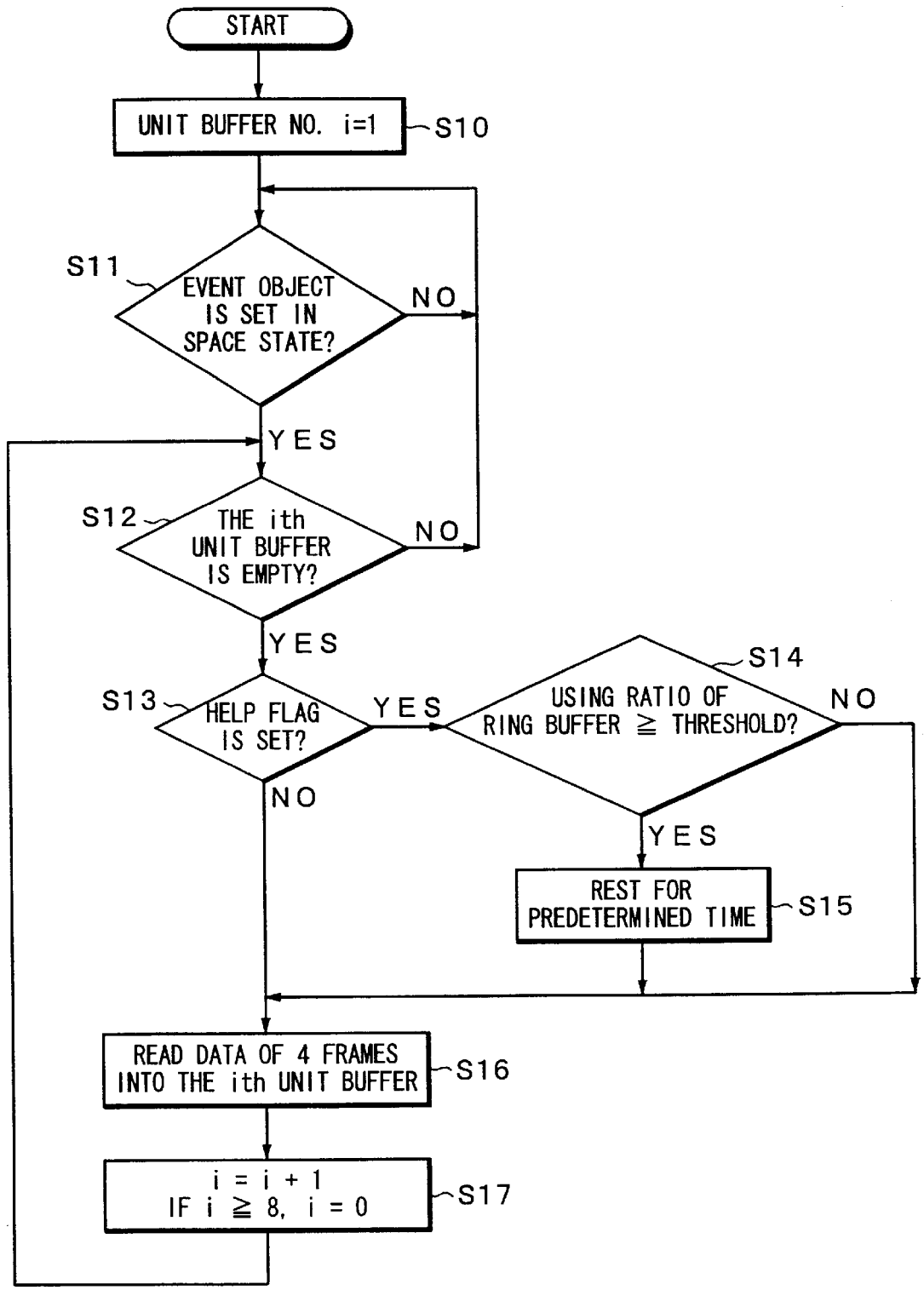
FIG. 5 is a flowchart showing a disk control according to the invention.
Figure 6B:
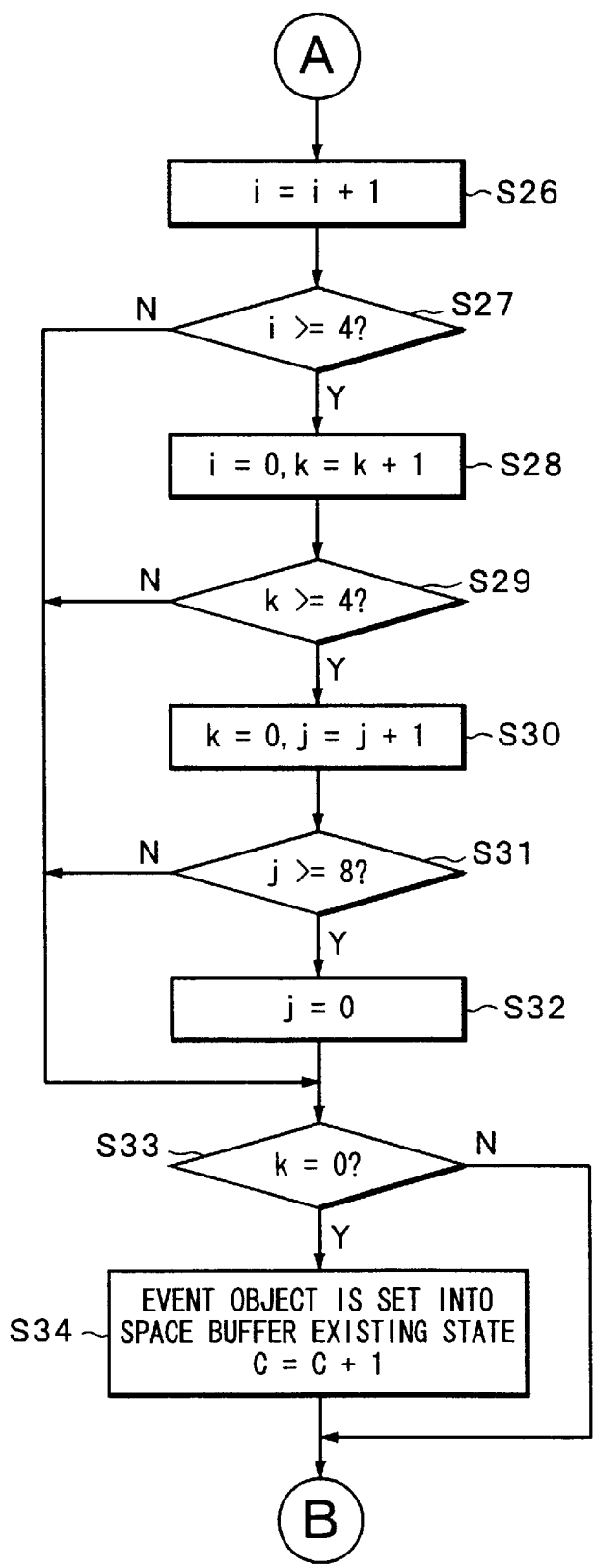

FIGS. 4, 5, 6A and 6B are flowcharts showing the above processes further in detail. FIG. 4 is the whole flowchart. FIGS. 5, 6A and 6B are the flowcharts showing the processes in the read thread 11 and output thread 5, respectively. In this example, it is assumed that the moving image bit stream has been compression encoded in the motion JPEG format as a compression encoding format of a moving image using the JPEG (Joint Photographic Coding Experts Group) format developed as a compression encoding format of a still image and recorded in the disk storage device 10.

First, the whole flowchart shown in FIG. 4 will be explained. In first step S1, the size of the maximum image frame among the individual image frames constructing the moving image bit stream which was distributed every 4-image frames and recorded as mentioned above into the disk storage device 10 of each of the elements 1 to 4 is obtained. In this example, since the size of the maximum frame has been stored in the header of the file, it is read. In step S2, the unit buffers 12a to 12h of a predetermined size are set in the ring buffer 12 of each of the elements 1 to 4 on the basis of the maximum frame size and the ring buffer 12 is therefore set up and assured.

When the ring buffer 12 is assured in step S2, in step S3, the image frames as much as the unit buffers, namely, four image frames are read out from the disk storage device 10 in each of the elements 1 to 4, respectively. The read-out image frames are stored into the head unit buffer (in the example of FIG. 2 mentioned above, the unit buffer 12a) in the ring buffer 12. In this example, since there are the four elements 1 to 4, 16 image frames as a whole are stored into the ring buffer 12.

In the embodiment, in each of the elements 1 to 4, if any one space unit buffer exists in the ring buffer 12, a flag called an event object to indicate the "space existing" state is set into each of the elements 1 to 4. In step S3, in each ring buffer 12, only one unit buffer 12a is filled with the image frames. Therefore, in subsequent step S4, the flag called the event object is set into the "space existing" state for each of the elements 1 to 4.

When the event object has been set in step S4, the read thread 11 is formed for each of the elements 1 to 4 in step S5. The reading operation of the image frames from the disk storage device 10, the storage of the read-out image frames into the ring buffer 12, and the like are executed. In step S6, the ring buffer 12 of each of the elements 1 to 4 is scanned by the output thread 5 and the image frames are set to the frame sequence of the correct time order and are outputted as a moving image bit stream. The process of the read thread 11 in step S5 and the process of the output thread 5 in step S6 are executed in parallel. The processes in steps S5 and S6 will be described in detail hereinlater.

The processes in the read thread 11 in step S5 mentioned above will now be described with reference to a flowchart of FIG. 5. As mentioned above, the processes of the flowchart shown in FIG. 5 are executed in parallel in each of the elements 1 to 4. Explanation will now be given relating to the element 1.

In step S10, a unit buffer number i as a number showing each of the unit buffers 12a to 12h in the ring buffer 12 is set to 1 by the read thread 11. The reason why the unit buffer number i is not set to i=0 showing the head unit buffer 12a is because the image frames have already been stored in the unit buffer 12a in step S3 mentioned above.

In step S11, the apparatus waits until it is checked whether the event object is in the "space existing" state or not. If the event object is set to the "space existing" state, the processing routine advances to step S12. The loop of step S11 corresponds to a function which the computer capable of multitasking has at the OS (Operating System) level and is performed without raising the load of the CPU.

In step S12, a check is made to see if the ith unit buffer shown by the unit buffer number i is empty. If the ith unit buffer is not empty, the processing routine is returned to step S11 and the apparatus enters a waiting state of "space existing" of the event object.

On the other hand, if the ith unit buffer is empty in step S12, the processing routine advances to step S13 and a check is made to see if the help flag has been set in the other elements (in this example, the elements 2, 3, and 4). If there is any element in which the help flag has been set, in the own element (in this example, the element 1), a check is made in step S14 to see whether the using ratio of the ring buffer 12 is equal to or higher than the preset threshold value $T_2$ or not. If the using ratio is equal to or higher than the threshold value $T_2$, the process of the read thread 11 is rested only for a predetermined time (step S15).

If the help flag is not set in the other elements in step S13, when the using ratio of the own ring buffer 12 is lower than the threshold value $T_2$ in step S14, or when a predetermined time elapses in step S15, the processing routine advances to step S16. The image frames are read out from the disk storage device 10 and the data as much as four image frames is stored into the ith unit buffer.

When the image frames for the ith unit buffer are stored in step S16, the number i showing the unit buffer is increased by only "1" in step S17. When the number i is equal to or larger than 8 by the increasing process, i=0 is set. When the unit buffer number i is set as mentioned above, the processing routine is returned to step S12 and the subsequent processes are repeated.

The processes in the output thread 5 in step S6 will now be described with reference to the flowchart of FIGS. 6A and 6B. The output thread 5 has a counter for counting the number of frames outputted. When the count value of the counter is an integer times as high as a preset period, the using ratio of the ring buffer 12 in each of the elements 1 to 4 is examined. When the using ratio is lower than the predetermined threshold value $T_1$, the help flag is set to the corresponding element.

In the output thread 5, the image frames are managed by: the element number i indicative of each of the elements 1 to 4; a unit buffer number j corresponding to the unit buffer number i used in the flowchart for the read thread 11 mentioned above; and a data number k in the unit buffer which is sequentially added to each of the four image frames which are stored into the unit buffers 12a to 12h from the preceding image frame with respect to the time. That is, in the output thread 5, if the image frame exists at a location shown by values of (i, j, k), it is outputted.

For example, when the image frame (i, j, k)=(2, 5, 2), the third image frame in the unit buffer 12f in the ring buffer 12 of the element 3 is outputted. The image frame existing at the location which is decided by the values of (i, j, k) is referred to as an image frame (i, j, k) hereinbelow.

The numbers i, j, and k are set to loop variables in the output thread 5 and it is assumed that they are started from 0 for convenience of explanation. That is, the element 1 corresponds to the element No. 0, the unit buffer 12a corresponds to the unit buffer No. 0, and the head image frame in the unit buffer corresponds to the data No. 0, respectively.

Further, as will be explained hereinlater, the flowcharts shown in FIGS. 6A and 6B are looped until all of the moving image bit streams stored in the disk storage devices 10 of the elements 1 to 4 are read out and EOD (End Of Data) is outputted. The whole loop is processed at a rate of 30 times/sec when, for example, the motion image bit stream comprises a motion image of 30 frames/sec. The help flag is checked at a rate of, for example, once/sec.

First in step S20, each value which is used in the output thread 5 is initially set. That is, the element No. i, unit buffer No. j, and data No. k in the unit buffer are set to 0, respectively. Further, a count value C is set to 0. Although not shown, the value of the foregoing period is set to, for instance, 30.

In step S21, the using ratio of the ring buffer 12 is examined and (count value C/period) is calculated in order to obtain a timing to perform the setting of the help flag or the like. In a calculation result, if the remainder is equal to 0, the processing routine advances to step S22. The using ratio of the ring buffer 12 of each of the elements 1 to 4 is examined by the output thread 5. When there is the ring buffer 12 in which the using ratio is smaller than the threshold value $T_1$, the help flag is set to the relevant element (step S23).

When the remainder of the calculation result is not equal to 0 in step S21, when the ring buffer 12 in which the using ratio is lower than the threshold value $T_1$ doesn't exist in step S22, or when the setting of the help flag is finished in step S23, the processing routine advances to step S24.

In step S24, a check is made to see if the image frame (i, j, k) exists. If the relevant location is empty and the image frame (i, j, k) doesn't exist, the processing routine advances to step S35 and the EOD is outputted. The series of flowcharts are finished.

When the image frame (i, j, k) exists in step S24, the processing routine advances to step S25 and the image frame (i, j, k) is outputted. The outputted image frame is displayed to, for example, a monitor.

When one image frame is outputted, the element number i is increased by only "1" in step S26. In subsequent steps S27 to S34, the loop variables i, j, and k are respectively calculated so as to obtain the outputs in accordance with the order shown in FIG. 3 mentioned above.

That is, when the element No. i is equal or larger than 4 (step S27), i=0 is set and the data No. k in the unit buffer is increased by only "1" (step S28). When k is equal to or larger than 4 (step S29), k=0 is set and the unit buffer No. j is increased by only "1" (step S30). Further, when the buffer No. j is equal to or larger than 8 (step S31), j=0 is set (step S32). When the element No. i is less than 4 in sep S27, when the data No. k in the unit buffer is less than 4 in step S29, when the unit buffer No. j is less than 8 in step S31, or when j=0 in step S32, whether k=0 or not is discriminated in step S33.

When k=0 in step S33, this means that a space occurs in the relevant unit buffer. The processing routine advances to step S34 and the event object is set into the "space existing" state. In step S34, the count value C is increased by only "1". The processing routine is returned to step S21. When k≠0 in step S33, the processing routine is also returned to step S21.

Since the processing routine is returned to step S21 and the above processes are repeated, the loop variables i, j, and k sequentially change. In step S25, the image frames are combined into one frame in accordance with the frame sequence and the combined image frame is outputted.

Figure 7:
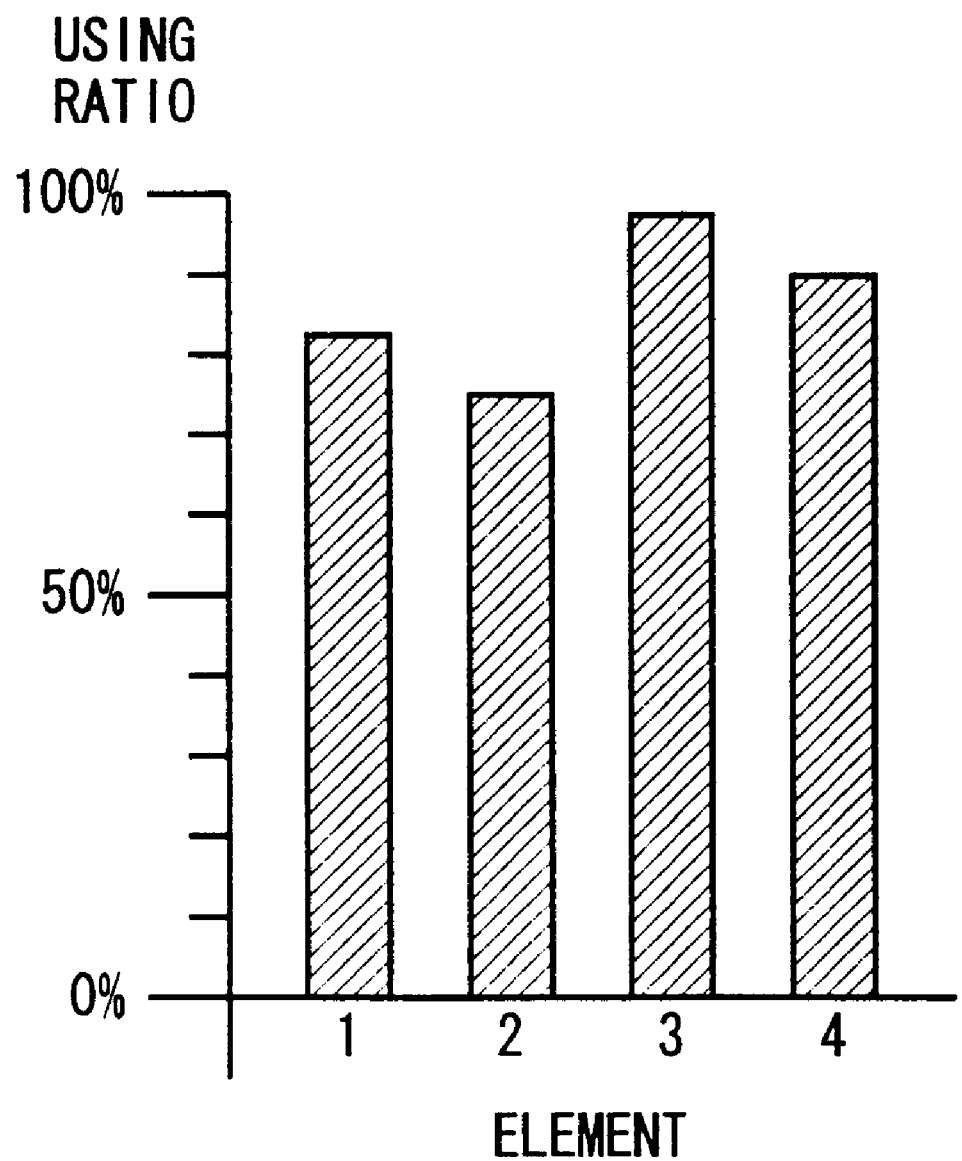
FIG. 7 is a graph showing an example of a using ratio of the ring buffer in each element at a certain time point.

FIG. 7 shows an example of the using ratio of the ring buffer 12 of each of the elements 1 to 4 at a certain time point. As shown in the diagram, the using ratios of the ring buffers 12 of the elements 1 to 4 are variable and the using ratios fluctuate with the elapse of time. As to why the using ratio of the ring buffer 12 of each of the elements 1 to 4 fluctuates as mentioned above, some reasons include the difference of cutting states of the files of the moving image bit streams when those files are arranged in the disk storage device 10 in each of the elements 1 to 4, a fluctuation in accessing speed of the disk storage device 10, or competition with the other streams.

However, eventually, the whole reading rate approaches the average reading rate of the disk storage device 10 as close as possible. As a whole system, therefore, the total reading rate of the average reading rates of the individual disk storage devices 10 is obtained as a principle. That is, according to the invention, the synchronization is not established among the elements 1 to 4 at the reading time point of the image frames from the disk storage devices 10. The fluctuation of the rate of each element is absorbed by the buffering operation of the ring buffer 12 and the efficiency for parallelization is improved.

In case of reading out the moving image bit stream and reproducing the moving image by the read-out bit stream, for instance, there is a case where reproduction such as double speed or triple speed is required. A case of performing the double-speed reproduction by the above construction will now be described.

Figure 8:
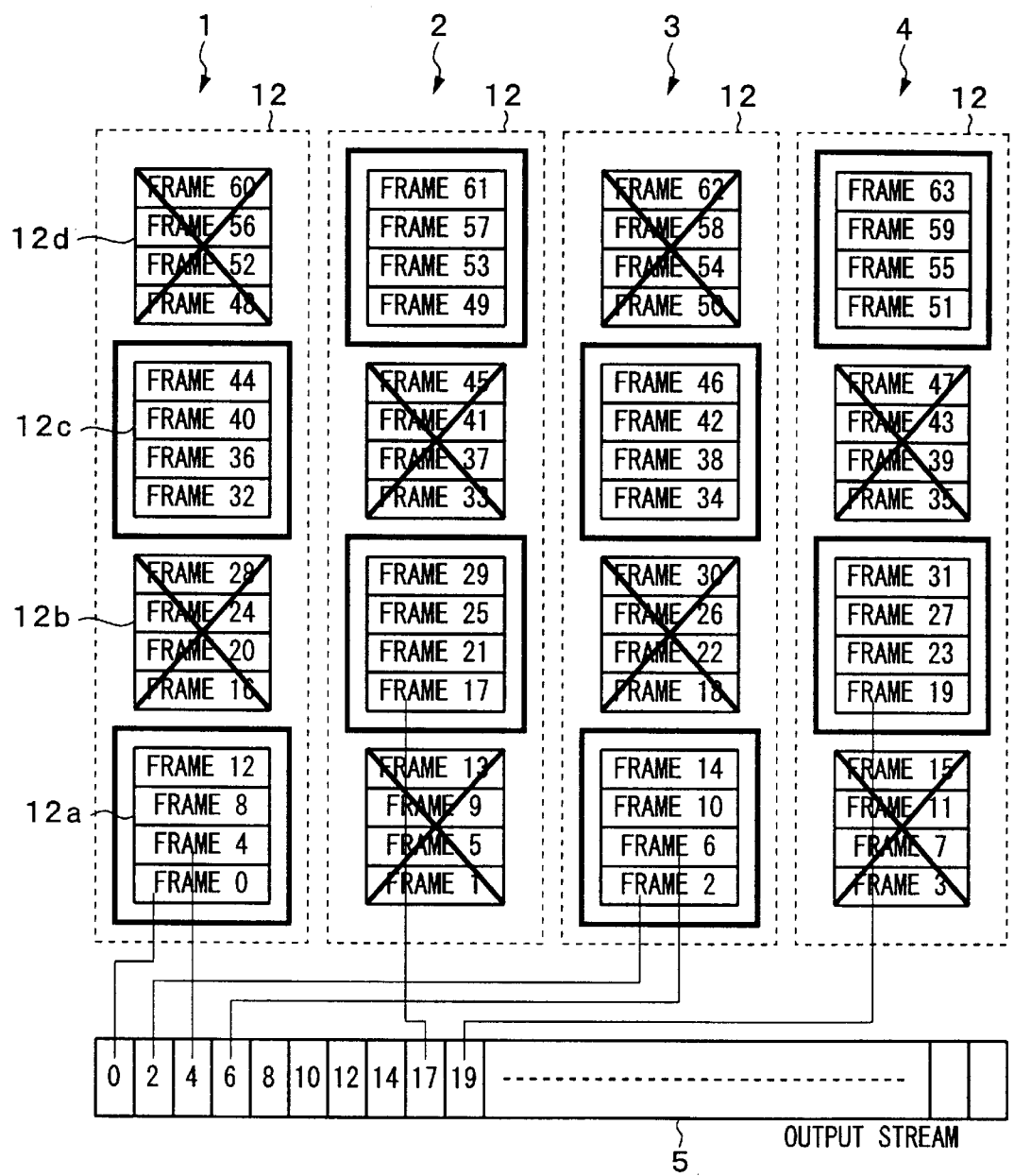
FIG. 8 is a diagram schematically showing a control in an output thread in case of performing a double-speed reproduction.

FIG. 8 schematically shows the control of the output thread 5 in case of performing the double speed reproduction. In the diagram, the unit buffers 12e to 12h in the ring buffer 12 are omitted. As mentioned above, in case of the double speed reproduction, the image frames are read out from the ring buffer 12 of each of the elements 1 to 4 every other unit block. In each of the elements 1 to 4, the unit block to be read out is deviated by one. In the odd-number designated elements 1 and 3, the image frames are read out from the unit block 12a. In the even-number designated elements 2 and 4, the image frames are read out from the unit block 12b. In the example of FIG. 8, no data is read out from the unit blocks marked with "X".

Figure 9:
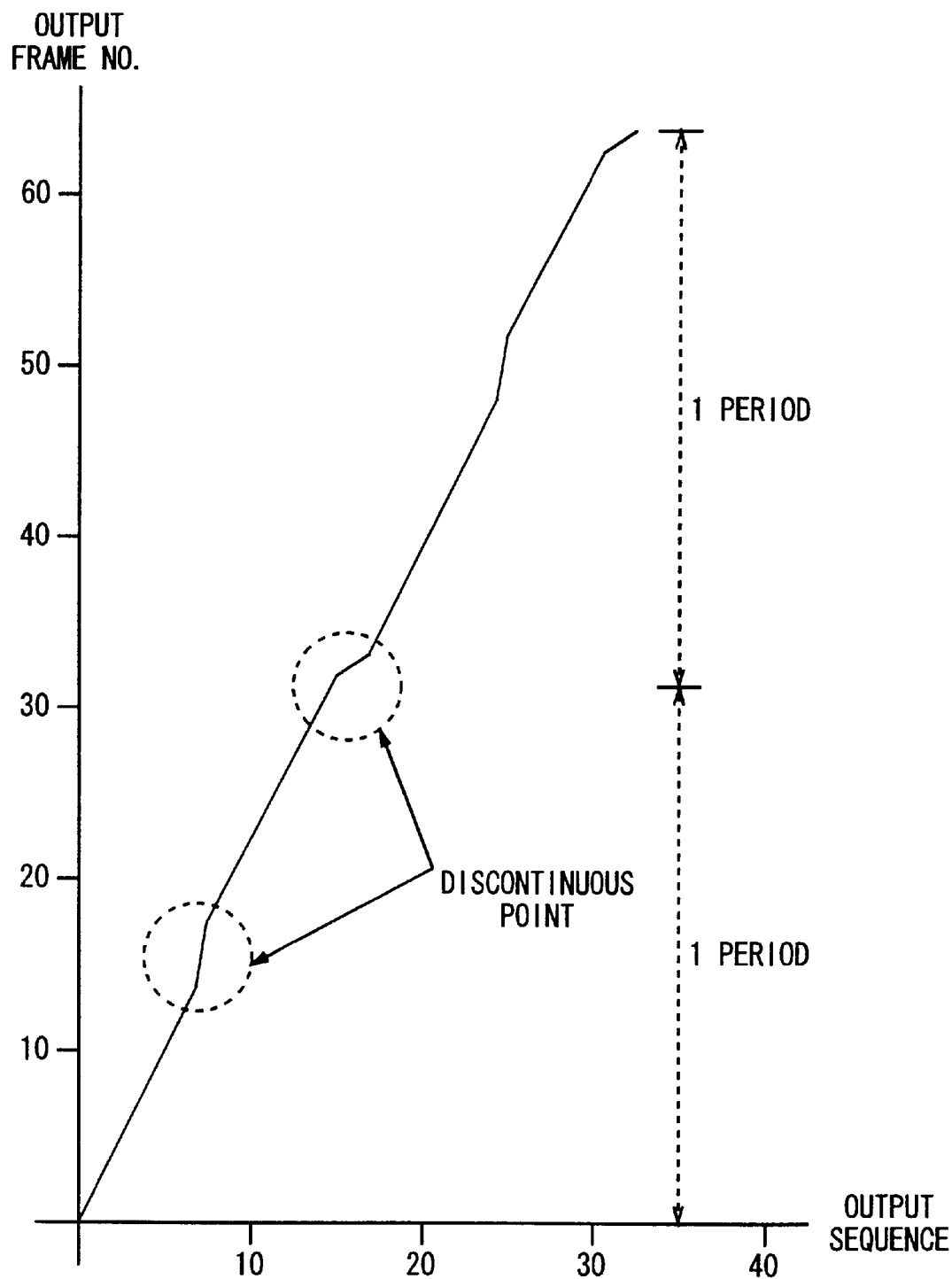
FIG. 9 is a diagram showing output frames when the double-speed reproduction is performed.

Outputs from the output thread 5 are first alternately read out from the odd-number designated elements 1 and 3 in a manner such as frame Nos. 0, 2, 6, . . . , 12, and 14 and are subsequently alternately read out from the even-number designated elements 2 and 4 in a manner such as frame Nos. 17, 19, 21, . . . , 29, and 31. In case of reading out the image frames as mentioned above, as shown in FIG. 9, discontinuous points exist every eight frames in the stream that is outputted and are converged to an inherent double-speed frame sequence. However, since those discontinuous points are points such that there is a possibility that a slight feeling of physical disorder is given in a scene such that a large object slowly moves at a constant speed, they don't actually cause any problem. The triple-speed reproduction or the 4-times speed reproduction can be also realized by a similar method.

Although one moving image bit stream of only one system has been outputted in the above description, the invention is not limited to this example. That is, in the actual A/V server or the like, a plurality of moving image bit streams are read out in parallel and are outputted in parallel to a plurality of output systems. The invention can be also applied to a system having the relation of a number of moving image bit streams and a number of outputs. In this case, for example, in case of outputting S moving image bit streams, (S×4) read threads 11, (S×4) ring buffers 12, and S output threads 5 are necessary. The disk storage device 10 can be commonly used.

Although eight unit buffers in which four image frames are set to one unit have been allocated to the ring buffer 12 in the above description, the invention is not limited to this example. The number of image frames which are stored into those unit buffers and the number of unit buffers which are allocated to the ring buffer 12 can be changed as necessary.

Further, although the case of applying the invention to the reading operation of the moving image bit streams from the disk storage device 10 has been described above, the invention is not limited to such an example. That is, the invention can be also applied to the case of writing data of the stream into the disk storage device 10. The processes upon writing are controlled substantially the same manner as that upon reading except that the direction of the stream is merely opposite to that mentioned above.

In other words, the moving image bit streams are continuously supplied to an input thread corresponding to the above output thread 5. The supplied streams are stored into the ring buffer 12 by the allocation shown in FIG. 3 mentioned above. A write thread corresponding to the foregoing read thread 11 is formed for each of the elements 1 to 4. The image frames read out from the ring buffer 12 every unit buffer are written into the disk storage device 10 by the access control of the disk storage device 10 by the write thread.

The using ratio of the ring buffer 12 of each of the elements 1 to 4 is monitored by the input thread and the help flag is set to the element of the low using ratio. The help flags are mutually monitored by the elements 1 to 4 and write thread. In the element in which the help flag has been set to the other elements and the using ratio of the own ring buffer 12 is low, the writing operation of the image frames to the disk storage device 10 is rested for a predetermined time.

By executing such a control even at the time of the writing operation, the writing rate of the whole system for the disk storage device 10 can be made to approach the average writing rate of each disk storage device 10 and the efficiency can be improved.

According to the invention as described above, the reading operation of the image frames from the disk storage device is controlled by the using ratios of the ring buffer of the other elements and the own element. There is, consequently, an effect such that the parallelization of the disk storage devices can be efficiently realized without using a special hardware such that the rotations of a plurality of disks are physically synchronized.

According to the invention, there is an effect such that in the plurality of simultaneous accessing states for the disk storage devices, the ability of the system can be dynamically distributed in accordance with the load and the effective utilization of resources can be realized.

The present invention is not limited to the foregoing embodiment but many modifications and variations are possible within the spirit and scope of the appended claims of the invention.

What is claimed is:

1. A high speed data recording apparatus for continuously storing an amount of data at a predetermined data rate, comprising:

a plurality of disk storage means connected in parallel and in which a bit stream of data is divided and stored;

at least one control means provided for each of said plurality of disk storage means for respectively independently controlling accesses to said disk storage means;

memory means provided for each of said disk storage means and having a circulative structure, whereby data written into said disk storage means is temporarily stored by a predetermined unit in accordance with a control by said control means;

input means for sequentially storing supplied bit streams of data so as to be said written into said respective memory means in accordance with a predetermined order; and means for examining a using ratio of each of said memory means and setting a flag indicative of a one of said memory means in which said using ratio is lower than a first threshold value, wherein said control means examines the using ratio of said one of said memory means corresponding to said flag and executes an access control for said disk storage means so that when said using ratio is higher than a second threshold value, if said flag has been set in any one of said memory means other than said one of said memory means corresponding to said flag, a writing operation of the data to said disk storage means corresponding to said one of said memory means corresponding to said flag is at rest for a predetermined time.

2. A high speed data reproducing apparatus for continuously reproducing an amount of data at a predetermined data rate, comprising:

a plurality of disk storage means connected in parallel and in which a bit stream of data is divided and stored;

at least one control means provided for each of said plurality of disk storage means for respectively independently controlling accesses to said disk storage means;

memory means provided for each of said disk storage means and having a circulative structure, whereby data read out from said disk storage means is temporarily stored on a predetermined unit basis on the basis of a control by said control means;

output means for sequentially reading out the data from said respective memory means in accordance with a predetermined order; and means for examining a using ratio of each of said memory means and setting a flag indicative of a one of said memory means in which said using ratio is lower than a first threshold value, wherein said control means examines the using ratio of said one of said memory means corresponding to said flag and executes an access control for said disk storage means so that when said using ratio is higher than a second threshold value, if said flag has been set in any one of said memory means other than said one of said memory means corresponding to said flag, a reading operation of the data from said disk storage means corresponding to said one of said memory means corresponding to said flag is at rest for a predetermined time.

3. A high speed data recording method for continuously recording an amount of data of a predetermined data rate, comprising the steps of:

dividing and storing a bit stream of data in a plurality of disk storage means;

providing at least one control step for each of said plurality of disk storage means and respectively independently controlling accesses to said disk storage means;

providing memory means for each of said disk storage means with a circulative structure such that data which is written into said disk storage means is temporarily stored on a predetermined unit basis on the basis of the control in said step of controlling;

sequentially storing supplied bit streams as said write data into said respective memory means in accordance with a predetermined order;

examining a using ratio of each of said memory means and setting a flag indicative of a one of said memory means in which said using ratio is lower than a first threshold value; and examining the using ratio of said one of said memory means corresponding to said flag and executing an access control for said disk storage means so that when said using ratio is higher than a second threshold value, if said flag has been set in any one of said memory means other than said one of said memory means corresponding to said flag, a writing operation of the data to said disk storage means corresponding to said one of said memory means corresponding to said flag is at rest for a predetermined time.

4. A high speed data reproducing method whereby an amount of data of a predetermined data rate is continuously reproduced, comprising the steps of:

dividing and storing a bit stream of data in a plurality of disk storage means;

providing at least one control step for each of said plurality of disk storage means and respectively independently controlling accesses to said disk storage means;

providing memory means for each of said disk storage means with a circulative structure such that data read out from said disk storage means is temporarily stored on a predetermined unit basis on the basis of the control in said step of controlling;

sequentially reading out the data from said respective memory means in accordance with a predetermined order;

examining a using ratio of each of said memory means and setting a flag indicative of a one of said memory means in which said using ratio is lower than a first threshold value; and examining the using ratio of said one of said memory means corresponding to said flag and executing an access control for said disk storage means so that when said using ratio is higher than a second threshold value, if said flag has been set in any one of said memory means other than said one of said memory means corresponding to said flag, a reading operation of the data from said disk storage means corresponding to said one of said memory means corresponding to said flag is at rest for a predetermined time.

* * * * *